C. D. Flynt.
Life Boat.

N° 90,833    Patented Jun. 1, 1869.

Witnesses.
Thos. S. Huntington
J. E. Shaw

Inventor:
Chester D. Flynt

United States Patent Office.

CHESTER D. FLYNT, OF PHILADELPHIA, PENNSYLVANIA.

Letters Patent No. 90,833, dated June 1, 1869.

IMPROVEMENT IN LIFE-BOATS.

The Schedule referred to in these Letters Patent and making part of the same.

*To all whom it may concern:*

Be it known that I, CHESTER D. FLYNT, of Philadelphia, Pennsylvania, have invented certain new and useful Improvements Applicable to Life-Boats, Batteaux, Yawls, and other Row-Boats; and I do hereby declare that the following is a full and exact description of the same, reference being had to the annexed drawings, forming part hereof, in which drawings—

Figure 3:
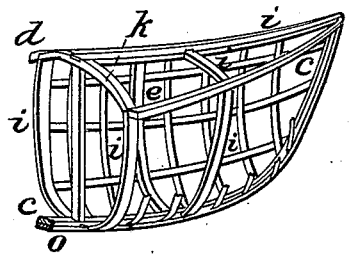

Figure 3, in detail, a perspective of the wooden braces, built, one in each end of such boat, to strengthen it, and furnish support for the interwoven steel frame and canvas cover of the bulkheads; some of the interwoven steel strips being also shown.

My object is the construction of boats which shall be at once very strong and very light.

I construct the skeleton of my boats of flat strips, or bands of steel interwoven, so as to form a net-work, in the manner of textile fabrics, as shown, the strips which run longitudinally being securely fastened at each end to a wooden keel; those strips which run transversely being fastened at their ends to the gunwales.

The skeleton thus formed is covered with heavy duck or canvas, which is made impervious to water by being well saturated with a mixture composed of linseed-oil and japan, in about equal proportions, or other proper materials, the whole being afterwards painted, as desired.

In the drawings—

*a* and *b* represent the steel strips.

*c*, fig. 3, the inside keel, which I prefer to make of wood.

*d* and *e*, the gunwales, which also I prefer to make of wood.

*f* and *g*, the air-tight bulkheads.

The longitudinal strips *a* are nailed, or otherwise securely fastened at both ends to the keel *c*.

The transverse strips *b* are similarly fastened to the gunwales *f* and *g*.

Figure 1:
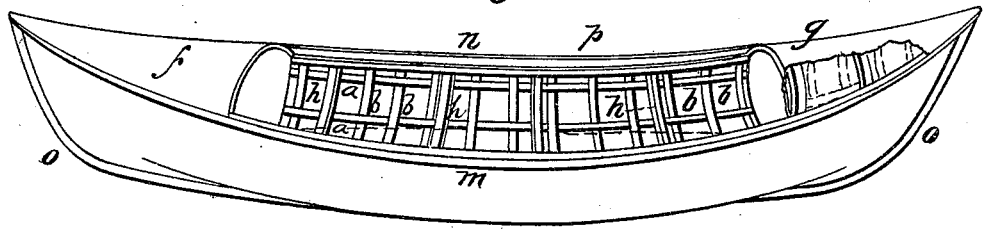
Figure 1 represents a perspective view of a life-boat, a portion of the external cover of one of its two bulkheads or air-tight chambers being broken away, to exhibit the continuation of the interwoven steel strips, which form the skeleton of the boat.
Figure 2:
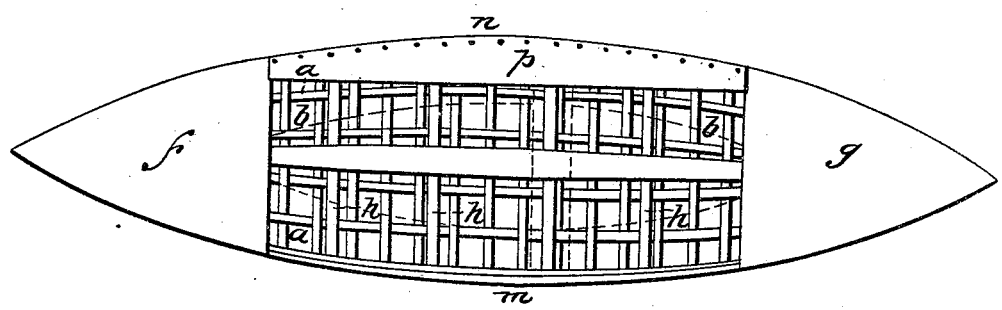
Figure 2 represents a plan of the same.

Ribs of wood, marked *h*, figs. 1 and 2, are employed to increase the stiffness of the boat.

*i k*, fig. 3, are wooden braces, on top of which the net-work of interwoven steel strips, which forms the skeleton cover of the bulkheads respectively, is placed.

These braces are firmly fastened together, and also to the gunwales and keel of the boat.

The longitudinal strips of the net-work which covers the bulkheads are fastened, at one end, to brace *k*, and at their other ends to the gunwales, and the transverse strips are fastened to the gunwales and the wooden braces covered by them.

The skeleton body of the boat, formed as described, is covered with canvas, which is fastened with nails, or other sufficient fastening, to the gunwales and keel of the boat.

The bulkheads are also covered with canvas, which is secured to the gunwales and wooden frame enclosed.

The inner ends of the bulkheads are formed of canvas, which is fastened to the wooden frame described.

*m n* are wooden mouldings, which cover the ends of the transverse steel strips, and also the edges of the canvas outside covering of the boat. The mouldings *m n* are secured to the gunwales respectively.

*o* represents what may be termed the outside keel. It is put into position after the covering of canvas has been secured to the skeleton of the boat. This outside keel *o* is securely fastened to the inside keel, marked *c*.

*p*, figs. 1 and 2, represents a strip of canvas, a foot or a foot and a half in width, more or less, secured to the gunwales, a similar strip being intended to be applied to each side of the boat.

These canvas strips are intended to be connected by straps and buckles, (not shown,) which extend, from one to the other at each end, across the bulkheads. These canvas strips act as guards, and materially assist in keeping out the water when the boat is overturned therein.

It is obvious that batteaux, skiffs, pleasure-barges, and other light boats, such as are commonly propelled by oars, may be built in the manner described, with or without the air-tight bulkheads.

Having thus described my invention,

I claim, and desire to secure by Letters Patent—

As a new article of manufacture, a boat, the body of which is formed of interwoven strips or bands of steel, and a covering of canvas, oiled and painted, or otherwise made impervious to water, the canvas and steel strips being fastened to the gunwales and keel of the boat, all substantially as set forth.

CHESTER D. FLYNT.

Witnesses:
THOS. S. HUNTINGTON,
J. E. SHAW.